UNITED STATES PATENT OFFICE.

EBEN N. HORSFORD, OF CAMBRIDGE, MASSACHUSETTS, AND CHARLES A. CATLIN, OF PROVIDENCE, RHODE ISLAND.

PREPARING ALKALINE BICARBONATES.

SPECIFICATION forming part of Letters Patent No. 270,668, dated January 16, 1883.

Application filed August 11, 1882. (No specimens.)

*To all whom it may concern:*

Be it known that we, EBEN N. HORSFORD, of Cambridge, in the State of Massachusetts, and CHARLES A. CATLIN, of the city and county of Providence, in the State of Rhode Island, have invented a new and useful Improvement in Process of Preparing Alkaline Bicarbonates for Use in Baking-Powders; and we do hereby declare that the following is a full, true, and exact description thereof.

In the manufacture of baking-powders in which bicarbonate of soda and certain acid salts are employed great difficulty is experienced in preparing them so as to prevent the reaction between these elements of their composition through the intervention of atmospheric moisture. Especially is this the case where certain deliquescent acid salts are employed—as, for instance, the acid phosphates. The object of our invention is to render this decomposition less liable of occurrence; and we effect this by investing the individual particles of powder of the bicarbonate with a superficial coating of neutral substance, so that the contact of the acid and alkaline carbonate is prevented until water has been added.

We take the bicarbonate of soda of commerce in its ordinary dry condition, and in any convenient receptacle or spread upon a tight floor moisten it thoroughly with a solution of sulphate of magnesia, and after drying and crushing use the product as bicarbonate of soda is used in the ordinary manufacture of baking-powders, of course taking into account, if necessary, the slight reduction of alkaline strength which our process entails.

In detail we have found the following weights and method of procedure to be most successful: We take one hundred (100) pounds of the crystallized sulphate of magnesia known in commerce as "Epsom salts," and dissolve it in about five hundred (500) pounds of water, removing, if necessary, any insoluble matter present by filtration. We now take two thousand (2,000) pounds of the bicarbonate of soda in its ordinary commercial condition, and, spreading it upon a tight floor, sprinkle it evenly with the sulphate-of-magnesia solution, shoveling it over and over during the sprinkling process, so as to obtain an even distribution of the solution among the crystals of soda.

We have found the best results to follow the use of a cold solution of sulphate of magnesia, for when a hot solution is employed the reaction between the bicarbonate and the magnesia salt so quickly ensues as to render nearly impracticable the attainment of a uniform mixture. With the cold solution, however, this reaction is very gradual. We now allow the the thoroughly-moistened mass to remain in its position upon the floor, turning it over from time to time until it has lost the greater part of its moisture, when we complete the desiccation by heat, being careful, however, not to employ a heat sufficient to drive off any of the carbonic acid from the bicarbonate of soda; or we may expose the moistened mass to the influence of a properly-regulated heat and dry it in a shorter time; or heat may be entirely dispensed with and atmospheric desiccation alone employed. The product as thus obtained is for the most part a loosely-coherent mass, which, before it can be used in the baking-powder mixture, requires crushing and bolting.

The chemical changes involved in this process will be readily appreciated by those familiar with chemical reactions, and it is only necessary to call attention to them in a general way to have them clearly understood. The bicarbonate of soda being nearly insoluble in the solution employed, the chemical reaction is merely superficial among its crystals, and this reaction through exchange of base results in sulphate of soda and bicarbonate of magnesia. The bicarbonate of magnesia, on drying, parts with a portion of its carbonic acid, and we have a precipitate of the solid and practically-inert carbonate of magnesia among the soda crystals, which serves as a protection more or less perfect when mixed with the acid salts.

We do not confine ourselves to the weights above given, for we are aware that good results may be obtained by varying the proportions. Neither do we confine ourselves to the use of sulphate of magnesia alone, for we may use with good effect any soluble salt which by double decomposition with the soda bicarbonate will result in a superficial coating of an inert or insoluble carbonate—as, for instance, the chlorides of calcium and magnesium; and it is obvious that bicarbonate of potassa may be treated with like good results in the same manner.

After the alkaline bicarbonate has been treated as described it is to be put up, with the usual proportion of acid salts in a dry state, in the common form for use as a baking-powder; or it may be put up in separate form, to be afterward combined with acid salts.

The present use of magnesium sulphate in solution for moistening and protecting the alkaline bicarbonates, as hereinbefore described, will be readily distinguished from the employment of magnesium sulphate in powdered form as an active ingredient in baking-powders with alkaline bicarbonates, as set forth in Letters Patent No. 239,602, issued to Charles A. Catlin, April 5, 1881.

What we claim as our invention, and desire to secure by Letters Patent, is—

1. The process of preparing alkaline bicarbonates, which consists in moistening the same with solutions of salts of magnesium, or with solutions of other salts which by double decomposition with the bicarbonates will form a superficial inert or less active carbonate, as described, and then drying the mass, as specified.

2. The herein-described product—viz., particles of alkaline bicarbonate superficially protected by less active or inert carbonates composed in part of a salt of magnesium or of calcium, as set forth.

EBEN N. HORSFORD.
CHARLES A. CATLIN.

Witnesses:
N. D. ARNOLD,
C. F. CHAFFEE.